United States Patent [19]
Jioio et al.

[11] 4,041,812
[45] Aug. 16, 1977

[54] SHIELD ELEMENT

[76] Inventors: Joseph F. Jioio, R.D. No. 6, Mount Odin Heights, Greensburg, Pa. 15601; Willis Howard Gardner, 823 Graham St., Belle Vernon, Pa. 15012

[21] Appl. No.: 700,920

[22] Filed: June 29, 1976

[51] Int. Cl.² .................................... B23B 27/00
[52] U.S. Cl. .................................... 82/34 R; 142/56
[58] Field of Search ............. 142/55, 56, 48, 49; 82/34 R; 144/251 R

[56] References Cited
U.S. PATENT DOCUMENTS

| | | | |
|---|---|---|---|
| 79,766 | 7/1868 | Lamphere | 142/55 |
| 240,279 | 4/1881 | Shimer | 82/34 R |
| 1,217,838 | 2/1917 | Schmidt | 82/34 R |
| 2,401,056 | 5/1946 | Dilley | 82/34 R |
| 2,648,239 | 8/1953 | Bechler | 408/241 G |

FOREIGN PATENT DOCUMENTS

| | | | |
|---|---|---|---|
| 24,346 | 12/1950 | Finland | 142/56 |
| 546,349 | 8/1922 | France | 82/34 R |
| 58,179 | 8/1891 | Germany | 82/34 R |
| 127,021 | 3/1959 | U.S.S.R. | 142/56 |

*Primary Examiner*—Leonidas Vlachos
*Attorney, Agent, or Firm*—Melvin A. Crosby

[57] ABSTRACT

A shield element for deflecting chips and the like in which the shield element is in the form of a transparent, preferably, plastic member and, preferably, concave toward the source of chips and is adapted for mounting directly on the tool taking the chips.

2 Claims, 7 Drawing Figures

U.S. Patent      Aug. 16, 1977      4,041,812
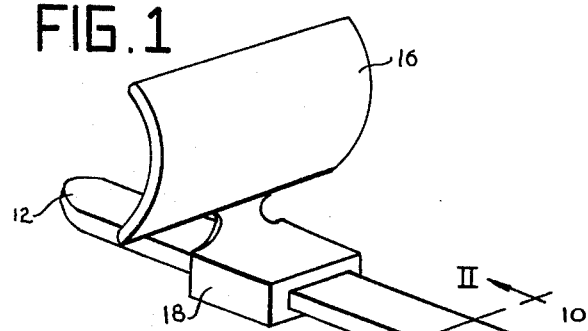
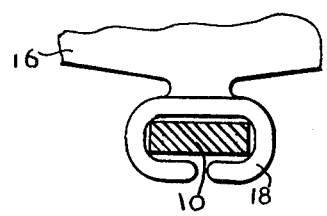
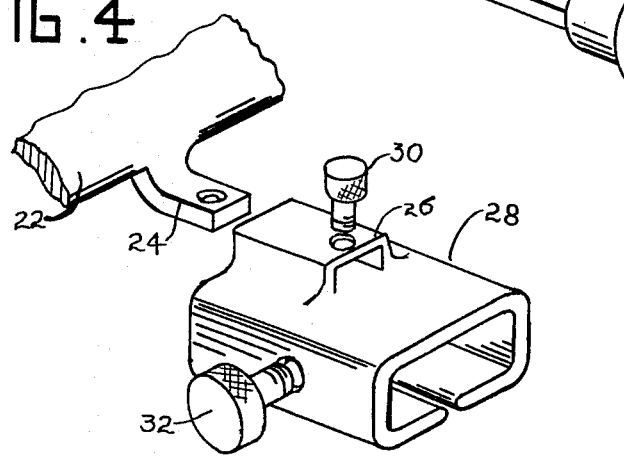
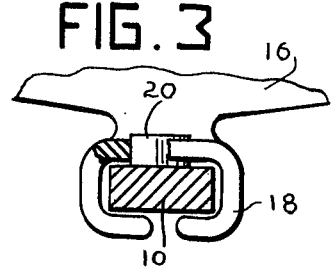
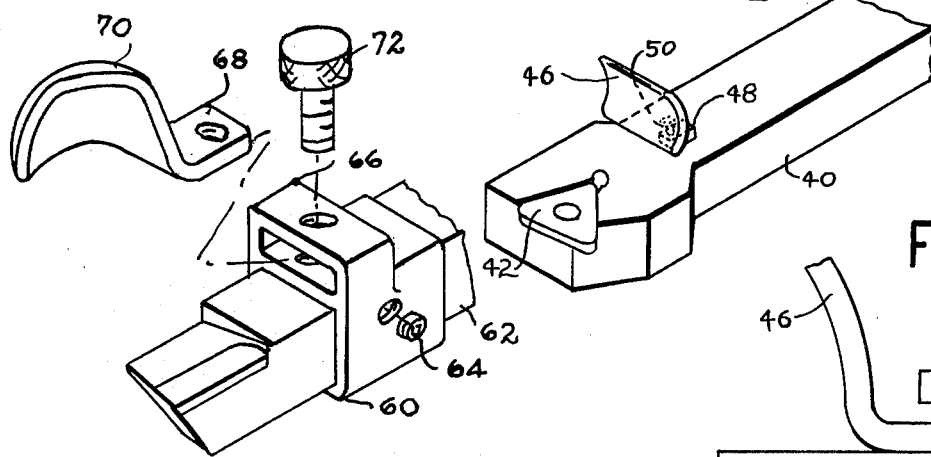
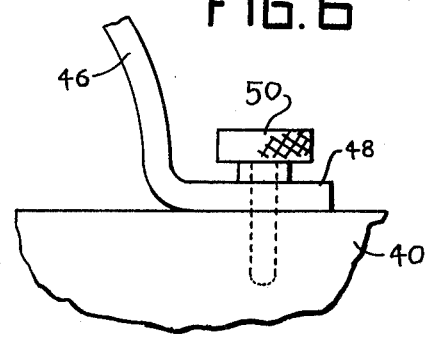

SHIELD ELEMENT

The present invention relates to a chip deflector and is particularly concerned with a chip deflector adapted for mounting on a tool taking the chips as, for example, a wood turning tool.

The protection of workmen from flying chips is a well known problem and is often solved in respect of machine tools by having large transparent shields on the machine which can be disposed over the work area and thereby prevent any chips from being thrown out of the work area.

In other cases, however, particularly with a woodworking tool, the tool is hand held, and there is no way in which a large shield member can be interposed between the work and the tool and flying chips in such a case can represent a problem and a hazard.

The object of the present invention is the provision of a shield member especially for mounting on a turning tool such as a wood tool which will deflect chips flying off from the work area back toward the same area thereby protecting the machine operator.

BRIEF SUMMARY OF THE INVENTION

According to the present invention, a relatively small shield member, formed of transparent material, preferably, plastic is arranged for mounting on a tool member, such as a wood turning tool, or on the tool holder for a metal turning cutting insert. The shield member is positioned close to the work area and chips flying off from the work area will be deflected by the shield and, thus, will not form any hazard to the machine operator.

In one form of the invention, the shield and the part that holds it to the tool is in one piece and in another case these elements are separate and detachably interconnected and in still another case the shield is configured to mount on a tool holder.

The exact nature of the present invention will become more apparent upon reference to the following detailed specification taken in connection with the accompanying drawings in which:

FIG. 1 is a perspective view showing a shield according to the present invention mounted on a wood turning tool.

FIG. 2 is a transverse section indicated by line II—II on FIG. 1.

FIG. 3 is a view like FIG. 2 but shows the use of a magnet to hold the shield in place on the tool.

FIG. 4 is a perspective view showing a modified arrangement in which the shield and the support member therefor are operable with the support member being engageable with a tool such as a wood turning tool.

FIG. 5 is a perspective view showing a shield member mounted on a tool holder for a metal turning cutting insert.

FIG. 6 is a section indicated by line VI—VI on FIG. 5.

FIG. 7 is a perspective view showing another embodiment of shield on a tool holder.

DETAILED DESCRIPTION OF THE INVENTION

Referring to the drawings somewhat more in detail, the metal turning tool of FIG. 1 has a steel member 10 with a sharp configuration 12 at one end for engagement with wood to be turned and a handle 14 at the other end. A shield member 16, according to the present invention, is mounted on steel part 10, and to this end is provided with a configured tab 18 which will engage a steel part 10 of the tool and be movable therealong but will, nevertheless, frictionally engage steel member 10 to hold the shield in adjusted positions therealong.

FIG. 3 shows the same arrangement with the same reference numerals employed except that a magnet element 20 is provided in the configured portion 18 for further assisting in holding the shield in a located position in steel part 10.

FIG. 4 shows an arrangement in which a shield member 22 has a rearwardly extending tab 24 at the bottom receivable in a pocket 26 on top of a holder 28 which may be metal. A screw 30 is provided for clamping tab 24 in pocket 26. Holder 28, which is preferably metal, is slidably mountable on a steel member such as the above described part 10 and can be clamped in any adjusted position therealong as by clamp screw 32.

FIG. 5 shows a tool holder 40 for supporting a metal turning insert 42 and mounted on holder 40 rearwardly of insert 42 is a shield 46 according to the present invention.

As will be seen in FIG. 6, shield 46 has a rearwardly extending tab 48 at the bottom adapted for receiving a clamp screw 50 threaded into holder 40.

FIG. 7 shows a modification in which a tubular slider 60, similar to what is shown in FIG. 4, is provided which can be slidably received over the shank 62 of a cutter bit and may be retained thereon as by set screw 64.

The slider has an element 66 upstanding therefrom and forming a pocket to receive the tail 68 of a concave deflector 70 and which can be held in place by the clamp screw 72 receivable in threaded holes provided therefor in the slider. The screw 72 may provide the clamping action for clamping the slider on the shank of the tool if desired.

The concave deflector 70 not only intercepts any chips flying toward a machine operator, but also deflects them in a desired direction as, for example, toward the sump portion of a machine which is provided for receiving chips.

Modifications may be made within the scope of the appended claims.

What is claimed is:

1. A chip shield, especially adapted for use with a turning tool having a chip taking cutting edge, comprising; a transparent element, support means near the lower edge of said element for supportingly and adjustably connecting the element to a cutting tool in a position to intercept chips taken by said cutting edge, said support means comprising a perforated tab projecting from the lower part of said element on the opposite side thereof from the cutting edge of the tool and a holder for the element, said holder comprising a first loop slidably receivable on a turning tool and a second loop integral with said first loop on top thereof for receiving said tab, said holder having a threaded aperture therein extending through said second loop and a wall of said first loop, and a clamp screw threaded into said aperture and extending through said perforation in said tab for securing the tab to the holder and clamping the holder to a tool on which the holder is mounted.

2. A chip shield according to claim 1 in which said transparent element is concave toward the working end of the tool and is tilted in the lateral direction.

* * * * *